UNITED STATES PATENT OFFICE.

JACOB WELTI, OF NEW YORK, N. Y., ASSIGNOR OF ONE-HALF TO SIGMUND S. HIRSCHLER, OF SAME PLACE.

COMPOSITION FOR WATERPROOFING TEXTILE MATERIALS.

SPECIFICATION forming part of Letters Patent No. 395,410, dated January 1, 1889.

Application filed November 19, 1887. Serial No. 255,630. (No specimens.)

*To all whom it may concern:*

Be it known that I, JACOB WELTI, a citizen of Switzerland, residing at New York, in the county and State of New York, have invented new and useful Improvements in Compositions for Waterproofing Textile Materials, of which the following is a specification.

This invention relates to a composition by means of which textile fabrics of silk, wool, cotton, hemp, flax, or other fibrous materials can be rendered water-proof, while at the same time the passage of air through said fabrics is not stopped up.

My compound is made of glue, sugar of lead, alum, and water, to which tin-salt or chloride of zinc, or both, may be added. The proportion in which these ingredients are mixed together varies according to the nature of the textile fabric to be treated—that is to say, according to the material from which it is made and according to its fineness and to its color. For woolen cloth the proportion is as follows: glue, from one-fourth to two parts, by weight; tin-salt, twelve parts, by weight; chloride of zinc, six parts, by weight; sugar of lead, twenty-five parts, by weight; alum, from two to five parts, by weight; water, one hundred parts, by weight—that is to say, one-fourth to two pounds of glue, twelve pounds of tin-salt, six pounds of chloride of zinc, twenty-five pounds of sugar of lead, and two pounds of alum; and then I dissolve these ingredients in one hundred pounds of water. For other fabrics, however, the proportion changes, so that it is not possible to give a uniform formula which is applicable to all fabrics; and I therefore must say that the proportion of the ingredients may vary as follows: glue, from one-fourth to two parts; tin-salt, from one to twelve parts; chloride of zinc, from one to six parts; sugar of lead, from ten to thirty parts; alum, from one to twenty-five parts; water, one hundred parts.

After the compound has been prepared in the manner above described I immerse the fabric to be treated in the solution, leaving it in the solution a sufficient length of time to produce the desired effect, the length of time being dependent upon the nature of the fabric and its color.

The tin-salt which I use is the well-known hydrated chloride of tin, ($SnCl_2 2H_2O$.)

What I claim as new, and desire to secure by Letters Patent, is—

A waterproofing composition consisting of glue, sugar of lead, alum, chloride of zinc, tin-salt, and water, as described.

In testimony whereof I have hereunto set my hand and seal in the presence of two subscribing witnesses.

JACOB WELTI. [L. S.]

Witnesses:
W. C. HAUFF,
E. F. KASTENHUBER.